Figure 2:
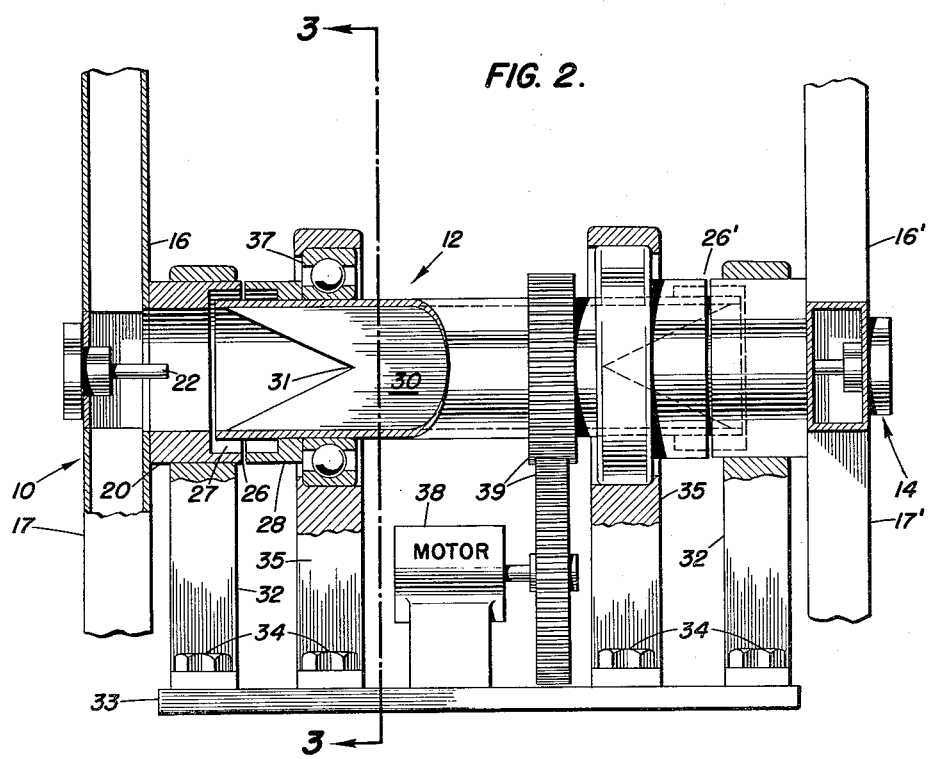

Aug. 8, 1961  A. E. SCHOENNAUER, JR  2,995,717
MICROWAVE PHASE SHIFTER

Filed April 14, 1955  3 Sheets-Sheet 1

INVENTOR.
ARTHUR E. SCHOENNAUER, JR
BY
ATTORNEYS

Aug. 8, 1961 A. E. SCHOENNAUER, JR 2,995,717
MICROWAVE PHASE SHIFTER
Filed April 14, 1955 3 Sheets-Sheet 2

ARTHUR E. SCHOENNAUER, JR.
INVENTOR.

BY
ATTORNEYS

Aug. 8, 1961　　　A. E. SCHOENNAUER, JR　　　2,995,717
MICROWAVE PHASE SHIFTER
Filed April 14, 1955　　　3 Sheets-Sheet 3

ARTHUR E. SCHOENNAUER, JR.
INVENTOR

BY
ATTORNEYS

United States Patent Office 2,995,717
Patented Aug. 8, 1961

2,995,717
MICROWAVE PHASE SHIFTER
Arthur E. Schoennauer, Jr., Palo Alto, Calif., assignor to the United States of America as represented by the Secretary of the Navy
Filed Apr. 14, 1955, Ser. No. 501,456
10 Claims. (Cl. 333—31)

The present invention relates to transmission circuits for microwaves and, more particularly, to improved continuous microwave phase shifters for use in waveguide circuits.

As an example of one of the many uses of continuous microwave phase shifters, reference is made to the interferometer homing system as described in patent application Serial Number 111,313 entitled, "Radar System For Determining the Relative Direction of Two Objects Moving in Space," filed August 19, 1949, by Otto J. Baltzer.

In the interferometer method of steering guided missiles, a phase shifter is employed to alter the phase between signals received by a pair of spaced antennas carried by the missile. Scanning of the antenna pattern is thereby provided to insure the detection by the missile of a target within its view. That is, scanning is required in order that all targets within the lethal range of the missile may be located by the missile. Otherwise, as the interferometer inherently possesses a number of "blind spots," targets could escape destruction merely by occupying a blind spot until the missile is safely past.

Since the interferometer method of missile guidance functions most effectively when two pairs of spaced antennas are employed, one pair delivering pitch plane steering signals, and the other pair delivering yaw plane steering signals, it is a usual requirement that two separate phase shifters be provided.

Accordingly, one of the objects of the present invention is to provide a single phase shifter capable of simultaneously shifting the phase of two separate microwave signals, while nevertheless preserving the identity of the signals.

The present invention has as another important object the provision of a device capable of altering the phase of a microwave signal by a precisely controllable amount.

Another object is to produce a device capable of altering the frequency of a microwave signal by continuously shifting the phase of said signal at a controlled rate.

An additional object of the present invention resides in the provision of a single continuous phase shifter which is capable of receiving two separate microwave signals and of providing two separate output signals having substantially all the characteristics of the input signals except for an alteration in frequency corresponding to the rate at which phase shift occurs.

Still another object of the present invention is to provide a phase shifter of simple construction, yet sufficiently rugged to withstand the rigorous environment imposed by guided missile applications.

Other objects and many of the attendant advantages of this invention will be readily appreciated as the same becomes better understood by reference to the following detailed description when considered in connection with the accompanying drawings.

Briefly, the present invention comprises a waveguide junction for converting plane polarized waves into circularly polarized waves. A rotatable phase shifter receives the circularly polarized waves and alters the phase thereof. An output junction, similar to the input junction, reconverts the circularly polarized waves into plane polarized waves for utilization in any appropriate manner.

The particular utility of the present invention resides in the combination of a turnstile junction transition section and a round waveguide phase shifter whereby a wave introduced into one of the branches of the transition section excites waves having right hand circular polarization and a second independent wave introduced into another branch of the transition section excites a left hand circularly polarized wave. The waves of opposite circular polarization coexist in the round waveguide and are separable by an output transition section similar to the input transition section.

Figure 1:
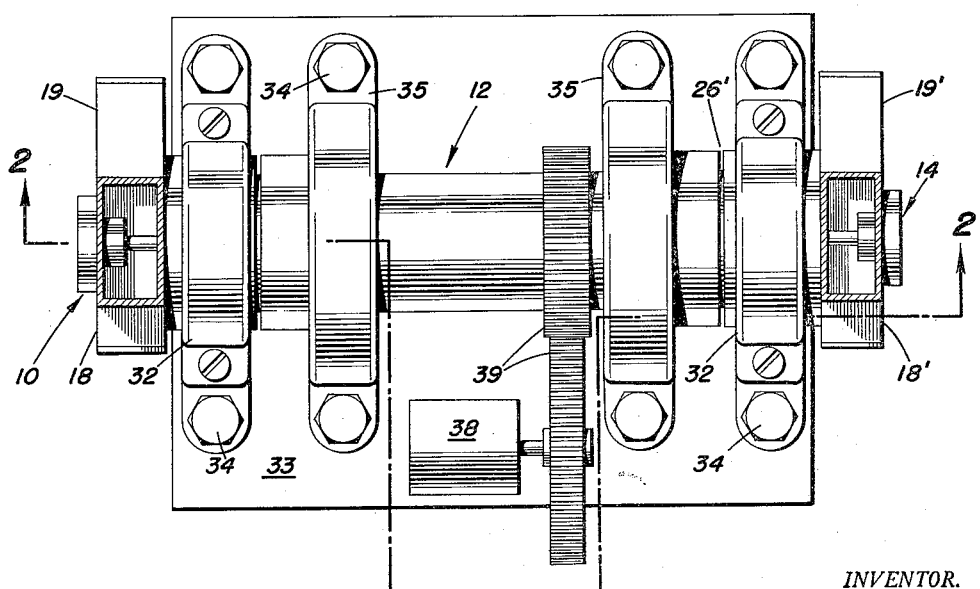
Figures 3, 4:
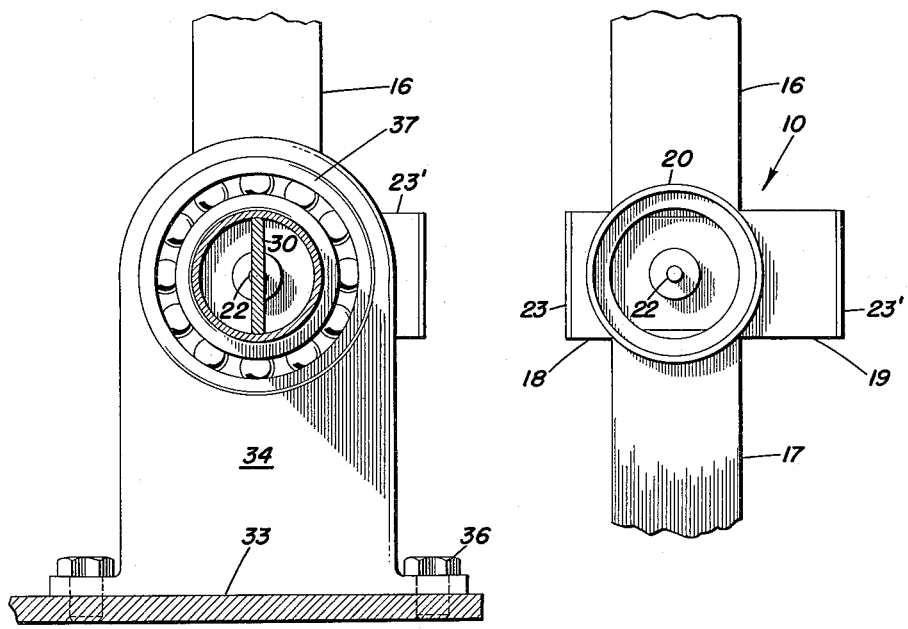
Figure 5:
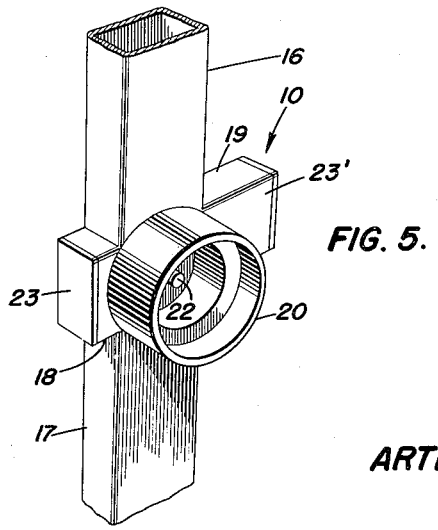

In the drawings:
FIG. 1 is a plan view of the phase shifter of the present invention;
FIG. 2 is a view along line 2—2 of FIG. 1, some parts being shown in elevation and other parts being shown in section;
FIG. 3 is a section along line 3—3 of FIG. 2;
FIG. 4 is a side elevation of one of the turnstile transition junctions of the phase shifter;
FIG. 5 is a perspective view of the turnstile junction shown in FIG. 4; and
FIG. 6 is a perspective view including a diagram showing the method of utilization of the phase shifter in an interferometer system of missile guidance.

In FIG. 1, the invention is shown as comprising an input turnstile junction 10, a rotatable waveguide section 12, and an output turnstile junction 14. The junctions are best seen in FIGS. 4 and 5, to which reference is now made.

The transition 10 is formed by the intersection of four rectangular waveguides and a circular waveguide. The rectangular waveguides include a first input branch 16, a second input branch 17, a first shorted waveguide arm 18 and a second shorted waveguide arm 19. All of the four rectangular waveguides are arranged to lie in the same plane and to intersect perpendicularly with the round waveguide 20. A matching post 22 is positioned at the intersection of the rectangular and circular waveguide axes to provide proper impedance matching.

As the impedances of the waveguides are matched, power fed into branch 16 will be divided between the rectangular arms 18 and 19 and the round waveguide 20 in the proportion of one-half to said round waveguide and one-quarter to each of said arms 18 and 19.

The arms 18 and 19 are short-circuited by plates 23, 23' so that power fed into these arms will be reflected back substantially without loss. All of the power reflected from the plates 23 and 23' will enter the round waveguide 20. The arms 18 and 19 differ in length by one-quarter wavelength thereby resulting in the reflected waves' arrival at the junction of the waveguides 180° out of phase. The length of the arm 18 is chosen to produce a phase difference of 90° between the waves entering the round waveguide directly from branch 16 and the waves reflected from plate 23 and entering the waveguide 20.

Since the waves directly entering the waveguide 20 and the waves reflected from the plates and entering the waveguide have their electric vectors disposed perpendicularly to one another, and since the vectors differ in phase by 90°, a circularly polarized wave is generated in the round waveguide 20.

It can be shown that regardless of the phase of the waves entering either of the branches 16 or 17, the action of the turnstile junction is to generate a circularly polarized wave of the same rotational sense. The element controlling the direction of rotation of the circularly polarized waves is the location of the longer arm 18 of the short-circuited arms 18 and 19. That is, waves entering the branch 17 encounter the longer arm 18 to their right and consequently the waves propagated in the round waveguide 20 rotate in a counterclockwise direction. On the other hand, waves entering the branch 16 encounter the longer arm 18 to their left and hence, will be propagated through the waveguide 20 with a clockwise direction of rotation.

Again referring to FIGS. 1 and 2, a rotatable section 12 of round waveguide is coupled by a suitable rotary joint 26 to the round waveguide section 20. The joint 26 may comprise a capacity type joint, as illustrated, or any of the usual types. The joint 26 is formed by providing thicker walls for the waveguide section 20 than for the rotatable section 12. A counterbore 27 approximately one-quarter wavelength deep receives the rotatable section 12. A flange 28 counterbored to a depth of approximately one-quarter wavelength is secured to the section 12 so as to allow insertion of the section 12 into the counterbore 27 the requisite depth. The rotary joint 26 provides adequate coupling of the round waveguide sections 12 and 20 without requiring contacting surfaces and thereby eliminates the wearing of surfaces which may occur in other types of rotary joints.

A half-wave plate 30 is press fitted in the rotatable section 12 so as to occupy a diametral plane thereof. The plate 30 is composed of dielectric material having an index of refraction appreciably different from air. Notches 31 are provided at both ends of the plate 30 to accomplish a smooth transition from air to the dielectric, thereby reducing reflections from said plate.

Ideally, the plate 30 provides precisely one-half the length of the waves propagated therethrough as separation between the apices of the notches 31. Thus the component of the circularly polarized wave which is aligned with the plate will be altered in phase by 180°.

As explained by G. C. Southworth in his book "Principles and Applications of Waveguide Transmission," (D. Van Nostrand publishers, 1950) at page 333, the half wave section has the effect of introducing a time phase variation in the waves propagated therethrough equal to twice the angle of inclination of the plate to a reference vector. In addition, the direction of rotation of a circularly polarized wave will be reversed. Therefore, the half wave plate 30 alters the phase of the waves transmitted by the section 12 in accordance with twice the amount of its rotation. Of course, whether the phase is advanced or retarded depends upon the direction of rotation of the section 12.

A turnstile junction 14 similar to the junction 10 receives the output of the section 12 through a suitable rotary joint 26' which may be identical to the joint 26. The junction 14 differs from the junction 10 in that its arms are disposed in mirror image relationship with the arms of junction 10. It will be recalled that the factor controlling the direction of rotation of the circularly polarized waves is the position of the longer of the shorted cross arms, namely arm 22. As the waves emerging from the rotatable section 12 rotate oppositely from their entry rotational direction, it is necessary that upon emergence they encounter the longer of the short-circuited arms in a position reversed from that of the entry junction. This provision allows the waves to emerge from the branches 16' and 17' situated similarly to the entry branches 16 and 17. Of course, an output junction identical with the input junction could be employed but as the result is an inversion of the output branch with respect to the input branch, such practice usually complicates the layout of the waveguides connected to the phase shifter.

The phase shifter may be used to introduce phase shift in discrete amounts or may be used to continuously shift the phase and thereby alter the frequency of the waves.

In FIGS. 1 and 2, the phase shifter is shown adapted to relatively high speed continuous rotation. The junctions 10 and 14 are supported by mounting posts 32 secured to a base plate 33 by screws 34. The section 12 is preferably supported in mounting posts 35, similar to the posts 32, by low friction ball bearings 37. Care should be taken properly to align the supporting posts and bearings in order that the axial play of the rotatable section 12 may be minimized. Axial play will, of course, introduce undesired noise in the output of the phase shifter in addition to increasing the wear of the moving parts.

The rotatable section 12 is driven by an electric motor 38 coupled thereto by gears 39. The particular gear ratio and motor speed employed is a matter of choice governed by the frequency alteration desired. For example, if it is desired to alter the frequency of the waves passing through the phase shifter by 60 c.p.s., it is necessary to drive the rotatable section 12 at half speed or 30 c.p.s. A large number of combinations of motor speeds and gear ratios are available to provide the proper speed. One such combination might be a motor running at 1800 r.p.m. and 1:1 gear ratio.

As an example of the application of the present invention to an interferometer system of missile guidance, a portion of the microwave circuit thereof is given in FIG. 6.

In FIG. 6, the phase shifter of the present invention appears generally at 40. The illustration of the phase shifter 40 is highly simplified, but it should be understood to comprise a device as illustrated in FIG. 1. Two pairs of antennas (not shown) are mounted on the missile. One pair of antennas is mounted in the missile pitch plane and provides signals for steering the missile in pitch. The second pair of antennas is mounted in the missile yaw plane and provides yaw steering signals.

The energy received by one of the pitch antennas is supplied by coaxial cable to branch 16 of the phase shifter, whereupon the frequency is shifted in accordance with the speed of rotation of said phase shifter.

The output of the phase shifter is conducted by branch 16' of the phase shifter to a directional coupler 41 which combines the frequency altered signal with the energy derived from the other of the pitch antennas. The combined signal appears in waveguide 42 which terminates in a balanced crystal mixer 43.

As is conventional in superheterodyne receivers, the combined pitch signal is reduced to an intermediate frequency signal by the action of a signal from a local oscillator 44, supplied through directional couplers 45 and 46, and the mixer 43. The intermediate frequency signals are amplified and detected by means not shown to provide the ultimate pitch control signal.

In like manner, one of the yaw antenna signals is applied to branch 17 of the phase shifter, altered in frequency and combined with the other yaw antenna signal, finally to provide a yaw intermediate frequency signal. Inasmuch as the phase shifter 40 preserves the identity of the pitch and yaw signals, a further description of the yaw channel is unnecessary, as the yaw channel amounts substantially to a duplication of the above described pitch channel.

In the interest of a complete understanding of the function of the phase shifter 40, the operation of the pitch channel of FIG. 6 will be retraced, noting the electrical quantities at various points therein.

The signal $E_1$ applied to branch 16 of phase shifter 40 may be characterized by $$E_1 = A \sin \omega_r t \quad (1)$$

where

A is the amplitude of the received signal, and
$\omega_r$ is the frequency thereof.

The signal $E_2$ in branch 16' differs from the signal in branch 16 by the phase shift $\phi$ introduced by phase shifter 40. Since the phase shifter 40 continuously introduces phase shift at a rate $\omega_s$, the signal $E_2$ will be $$E_2 = A \sin (\omega_r + \omega_s) t \quad (2)$$

The signal $E_3$ from the other pitch antenna differs in phase from $E_1$ by an amount depending, in part, upon the orientation $\beta$ of a remote target, so that $$E_3 = E_1/K \sin \beta = A \sin (\omega_r t + K \sin \beta) \quad (3)$$

In waveguide 42, the sum of the voltages $E_3$ and $E_2$ appears. It can be shown that the result of such addition is to produce an amplitude modulated wave, the carrier $E_c$ of which is $$E_c = A_c \sin \left[\left(\omega_r + \frac{\omega_s}{2}\right)t + K \sin \beta\right] \quad (4)$$

The modulation $E_M$ impressed upon the carrier $E_c$ varies as $$E_M = A_2 \cos \tfrac{1}{2}(\omega_s t - K \sin \beta) \quad (5)$$

where $A_2$ is an arbitrary amplitude.

The carrier frequency of the modulated wave is reduced by conversion in the balanced mixer 43. The intermediate frequency signal resulting from the conversion may be utilized in a manner described in the patent application entitled "Scanning Interferometer-Beam Rider Guidance System," Serial No. 319,624, filed November 10, 1952, by C. W. Brown et al.

In the Brown application, the amplification, detection, and utilization means are fully disclosed. It should be understood that the present invention is confined to the phase shifting apparatus, and that reference is made herein to associated apparatus merely for the purpose of illustrating one beneficial application.

Obviously many modifications and variations of the present invention are possible in the light of the above teachings. It is, therefore, to be understood that within the scope of the appended claims the invention may be practiced otherwise than as specifically described.

What is claimed is:

1. Apparatus for simultaneously shifting the phase of two independent plane polarized microwaves, comprising a turnstile junction including a pair of input arms each of which is arranged to receive one of the plane polarized waves for converting said waves into circularly polarized waves of opposite sense of rotation, a waveguide section receiving said circularly polarized waves, means in said waveguide section for reversing the direction of rotation of said circularly polarized waves, and an output turnstile junction including a pair of output arms for reconverting the reversed circularly polarized waves into two independent plane polarized waves, one of which appears in each of said output arms.

2. Apparatus as claimed in claim 1, wherein said means in said waveguide comprises dielectric filling said waveguide and an inhomogeneity in said dielectric.

3. Apparatus as claimed in claim 2, wherein said inhomogeneity comprises a solid dielectric strip having an index of refraction appreciably different from the index of refraction of said dielectric filling said waveguide and having a length substantially one-half the wavelength of the waves contained therewithin.

4. A microwave phase shifter for simultaneously shifting the phase of two independent microwave signals, comprising means for converting one of said signals into circularly polarized waves having a first direction of rotation, means for converting the other of said signals into circularly polarized waves having a direction of rotation opposite from said first direction, common means receiving both of said circularly polarized waves, means in said common means for reversing the direction of rotation of both of said circularly polarized waves, and means responsive to the direction of rotation of said circularly polarized waves for separating said circularly polarized waves according to the direction of rotation of said waves and for reconverting said circularly polarized waves into individual plane polarized waves.

5. A device as claimed in claim 4, wherein said common means for receiving said circularly polarized waves comprises a waveguide having a circular cross section.

6. A device as claimed in claim 4, wherein said common means for receiving said circularly polarized waves comprises a waveguide having a circular cross section and said means for reversing the direction of rotation of said circularly polarized waves comprises a plate of dielectric material in said waveguide having a length substantially one half the length of the waves contained therewithin.

7. A microwave phase shifter for simultaneously shifting the phase of two independent microwave signals, comprising an input turnstile junction including a first rectangular waveguide input arm, a second rectangular waveguide input arm and a circular waveguide intersecting said first and second input arms, means for applying the first of said signals to said first input arm, means for applying the second of said signals to said second input arm, said junction converting said first input signal into a circularly polarized wave rotating in a first direction in said circular waveguide and converting said second input signal into a circularly polarized wave rotating in a direction opposite to said first direction in said circular waveguide, a rotatable section of circular cross section waveguide aligned with said input junction circular waveguide and forming an extension thereof, means in said rotatable section for reversing the direction of rotation of both of said circularly polarized waves therewithin, and an output turnstile junction including a circular waveguide section aligned with said rotatable waveguide section and forming an extension thereof, and including a first output rectangular waveguide section intersecting said output junction circular waveguide and a second output rectangular waveguide section intersecting said output junction circular waveguide.

8. A device as claimed in claim 7, wherein said means for reversing the direction of rotation of said circularly polarized waves comprises a dielectric plate inserted in said rotatable section and having a length substantially one-half the length of the waves contained therewithin.

9. A device as claimed in claim 8, wherein said plate includes impedance matching means at each end thereof, said plate being an odd number of half wavelengths of the waves contained therewithin in length.

10. A device as claimed in claim 8, with additional means for continuously rotating said rotatable section thereby providing a continuous phase variation in the waves propagated through said rotatable section.

References Cited in the file of this patent

UNITED STATES PATENTS

| | | |
|---|---|---|
| 2,425,345 | Ring | Aug. 12, 1947 |
| 2,607,849 | Purcell | Aug. 19, 1952 |
| 2,686,901 | Dicke | Aug. 17, 1954 |
| 2,713,151 | Farr | July 12, 1955 |